United States Patent [19]
Schaffner

[11] Patent Number: 5,862,190
[45] Date of Patent: Jan. 19, 1999

[54] METHOD AND APPARATUS FOR DECODING AN ENCODED SIGNAL

[75] Inventor: Terry Michael Schaffner, Palatine, Ill.

[73] Assignee: Motorola, Inc., Schaumburg, Ill.

[21] Appl. No.: 581,696

[22] Filed: Dec. 29, 1995

[51] Int. Cl.[6] .............................. H03D 1/00; H04L 27/06
[52] U.S. Cl. ..................... 375/341; 371/43.6; 371/43.8
[58] Field of Search .................................. 375/262, 265, 375/341, 267, 340, 347, 349; 371/43, 43.6, 43.8, 43.7

[56] References Cited

U.S. PATENT DOCUMENTS

| | | |
|---|---|---|
| 4,945,549 | 7/1990 | Simon et al. . |
| 5,134,635 | 7/1992 | Hong et al. . |
| 5,156,608 | 10/1992 | Falconer et al. . |
| 5,204,874 | 4/1993 | Falconer et al. . |
| 5,233,629 | 8/1993 | Paik et al. . |
| 5,321,725 | 6/1994 | Paik et al. . |
| 5,442,627 | 8/1995 | Viterbi et al. . |
| 5,450,453 | 9/1995 | Frank ........................................ 375/200 |
| 5,502,713 | 3/1996 | Lagerqvist et al. . |
| 5,608,763 | 3/1997 | Chiasson et al. ........................ 375/332 |

Primary Examiner—Jason Chan
Assistant Examiner—Jean B. Corrielus
Attorney, Agent, or Firm—Richard A. Sonnentag

[57] ABSTRACT

A decoder (215) implemented in a receiver of a wireless communication system employs an improved method and apparatus for decoding an encoded signal. The receiver sums the energy values (156A, 156B, . . . 156N) from a plurality of fingers within to produce an aggregate energy value (166). From the aggregate energy value (166), a set of log-likelihood values (207) are generated with a non-linear function generator (205) before being deinterleaved by a deinterleaver (210). The deinterleaved values (213) are input to the decoder (215) which estimates the original signal (178) by incorporating path histories of bits in the estimation of subsequent, related bits. Use of the path histories of bits improves the estimates of the original signal (178), which translates into an increase in the sensitivity of the receiver.

13 Claims, 3 Drawing Sheets

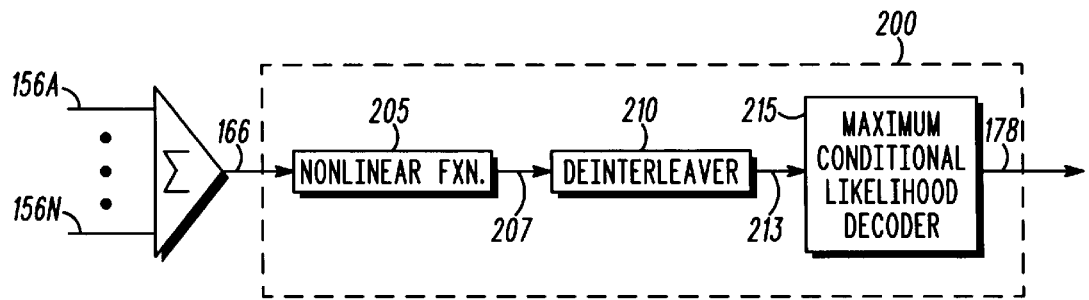
FIG.2
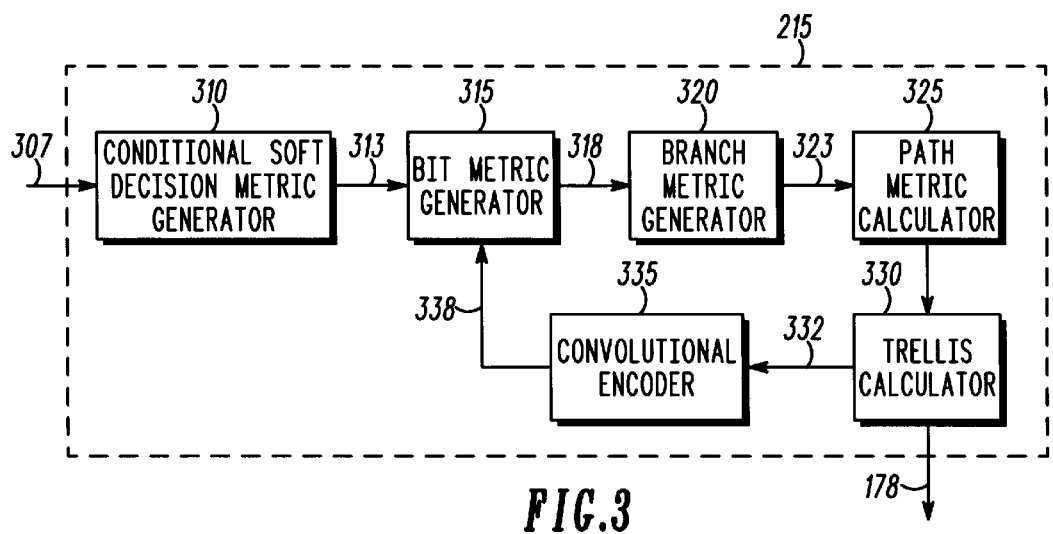
FIG.3
| DEINTERLEAVING MATRIX | | |
|---|---|---|
| $M_{1,1}$ | $M_{1,2}$ | $M_{1,3}$ |
| $M_{2,1}$ | $M_{2,2}$ | $M_{2,3}$ |
| $M_{3,1}$ | $M_{3,2}$ | $M_{3,3}$ |
| • | • | • |
| • | • | • |
| • | • | • |
| $M_{32,1}$ | $M_{32,2}$ | $M_{32,3}$ |
400
$M_{i,j}$ = GROUP OF LOG-LIKLIHOOD VALUES FOR ROE i, COLUMN j OF THE INTERLEAVER ARRAY
FIG.4

METHOD AND APPARATUS FOR DECODING AN ENCODED SIGNAL

FIELD OF THE INVENTION

The present invention relates generally to wireless communication systems and, more particularly, to decoding of an orthogonally encoded signal in a wireless communication system.

BACKGROUND OF THE INVENTION

Communication systems take many forms. In general, the purpose of a communication system is to transmit information-bearing signals from a source, located at one point, to a user destination, located at another point some distance away. A communication system generally consists of three basic components: transmitter, channel, and receiver. The transmitter has the function of processing the message signal into a form suitable for transmission over the channel. This processing of the message signal is referred to as modulation. The function of the channel is to provide a physical connection between the transmitter output and the receiver input. The function of the receiver is to process the received signal so as to produce an estimate of the original message signal. This processing of the received signal is referred to as demodulation.

Two types of two-way communication channels exist, namely, point-to-point channels and point-to-multipoint channels. Examples of point-to-point channels include wirelines (e.g., local telephone transmission, microwave links, and optical fibers). In contrast, point-to-multipoint channels provide a capability where many receiving stations may be reached simultaneously from a single transmitter (e.g. cellular radio telephone communication systems). These point-to-multipoint systems are also termed Multiple Address Systems. (MAS).

Analog and digital transmission methods are used to transmit a message signal over a communication channel. The use of digital methods offers several operational advantages over analog methods, including and not limited to: increased immunity to channel noise and interference, flexible operation of the system, common format for the transmission of different kinds of message signals, improved security of communication through the use of encryption, and increased capacity.

These advantages are attained at the cost of increased system complexity. However, through the use of very large-scale integration (VLSI) technology, a cost-effective way of building the hardware has been developed.

To transmit a message signal (either analog or digital) over a bandpass communication channel, the message signal must be manipulated into a form suitable for efficient transmission over the channel. Modification of the message signal is achieved by means of a process termed modulation. This process involves varying some parameter of a carrier wave in accordance with the message signal in such a way that the spectrum of the modulated wave matches the assigned channel bandwidth. Correspondingly, the receiver is required to recreate the original message signal from a degraded version of the transmitted signal after propagation through the channel. The re-creation is accomplished by using a process known as demodulation, which is the inverse of the modulation process used in the transmitter.

In addition to providing efficient transmission, there are other reasons for performing modulation. In particular, the use of modulation permits multiplexing, that is the simultaneous transmission of signals from several message sources over a common channel. Also, modulation may be used to convert the message signal into a form less susceptible to noise and interference.

For multiplexed communication systems, the system typically consists of many remote units (i.e. subscriber units) which require active service over a communication channel for a short or discrete portion of the communication channel resource rather than continuous use of the resources on a communication channel. Therefore, communication systems have been designed to incorporate the characteristic of communicating with many remote units for brief intervals on the same communication channel. These systems are termed multiple access communication systems.

One type of multiple access communication system is a spread spectrum system. In a spread spectrum system, a modulation technique is utilized in which a transmitter signal is spread over a wide frequency band within the communication channel. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. However, in a spread spectrum system, the modulation baseband signal (e.g., a voice channel) with a bandwidth of only a few kilohertz, will be transformed into signal which occupies and is transmitted over a frequency band that may be many megahertz wide. This is accomplished by modulating the signal to be transmitted with the information to be sent and with a wideband encoding signal. Three general types of spread spectrum communication techniques exist, including:

Direct Sequence

The modulation of a carrier by a digital code sequence whose bit rate is much higher than the information signal bandwidth. Such system are referred to as "direct sequence" modulated systems.

Hopping

Carrier frequency shifting in discrete increments in a pattern dictated by a code sequence. These systems are called "frequency hoppers." The transmitter jumps from frequency to frequency within some predetermined set; the order of frequency usage is determined by a code sequence. Similarly "time hopping" and "time-frequency hopping" have times of transmission which are regulated by a code sequence.

Chirp

Pulse-FM or "chirp" modulation in which a carrier is swept over a wide band during a given pulse interval. Information (i.e. the message signal) can be embedded in the spread spectrum signal by several methods. One method is to add the information to the spreading code before it is used for spreading modulation. This technique can be used in direct sequence and frequency hopping systems. It will be noted that the information being sent must be in a digital form prior to adding it to the spreading code, because the combination of the spreading code and the information, typically a binary code, involves modulo-2 addition. Alternatively, the information or message signal may be used to modulate a carrier before spreading it.

Thus, a spread spectrum system must have two properties: (1) the transmitted bandwidth should be much greater than the bandwidth or rate of the information being sent and (2) some function other than the information begin sent is employed to determine the resulting modulated channel bandwidth.

Spread spectrum communication systems can be multiple access communication systems. One type of multiple access spread spectrum system is a code division multiple access (CDMA) system. In a CDMA system, communication between two communication units is accomplished by spreading each transmitted signal over the frequency band of the communication channel with a unique user spreading code. As a result, transmitted signals are in the same frequency band of the communication channel and are separated only by unique user spreading codes. These unique user spreading codes preferably are orthogonal to one another such that the cross-correlation between the spreading codes is approximately zero. CDMA systems may use direct sequence or frequency hopping spreading techniques. Particular transmitted signals can be retrieved from the communication channel by despreading a single representative of the sum of signals in the communication channel with a user spreading code related to the particular user spreading code such that only the desired user signal related to the particular spreading code is enhanced while the other signals for all of the other users are not enhanced.

It will be appreciated by those skilled in the art that several different spreading codes exist which can be used to separate data signals from one another in a CDMA communication system. These spreading codes include but are not limited to pseudo noise (PN) codes and Walsh codes. A Walsh code corresponds to a single row or column of the Hadamard matrix. For example, in a 64 channel CDMA spread spectrum system, particular mutually orthogonal Walsh codes can be selected from the set of 64 Walsh codes within a 64 by 64 Hadamard matrix. Also, a particular data signal can be separated from the other data signals by using a particular Walsh code to spread the particular data signal.

Further, it will be appreciated by those skilled in the art that spreading codes can be used to channel code data signals. The data signals are channel coded to improve performance of the communication system by enabling transmitted signals to better withstand the effects of various channel impairments, such as noise, fading, and jamming. Typically, channel coding reduces the probability of bit error, and/or reduces the energy per bit per noise density ($E_b/N_0$), to recover the signal at the cost of expending more bandwidth than would otherwise be necessary to transmit the data signal. For example, Walsh codes can be used to channel code a data signal prior to modulation of the data signal for subsequent transmission.

A typical spread spectrum transmission involves expanding the bandwidth of an information signal, transmitting the expanded signal, and recovering the desired information signal by remapping the received spread spectrum into the original information signal's bandwidth. The series of bandwidth transformation used in spread spectrum signaling allows the communication system to deliver a relatively error free signal in a noisy signal environment or communication channel. The quality of recovery of the transmitted information signal from the communication channel is measured by the error rate (i.e., the number of errors in the recovery of the transmitted signal over a particular time span or received bit span) for some $E_b/N_0$. As the error rate increases, the quality of the signal received by the receiving party decreases. As a result, communication systems typically are designed to limit the error rate to an upper bound or maximum so that the degradation in the quality of the received signal is limited. In CDMA spread spectrum communication systems, the error rate is related to the noise interference level in the communication channel which is directly related to the number of simultaneous but code divided users within the communication channel. Thus, in order to limit the maximum error rate, the number of simultaneous code divided users in the communication channel is limited. However, the error rate can be reduced by using a channel coding scheme. Therefore, by using channel coding schemes, the number of simultaneous users in a communication channel can be increased while still maintaining the same maximum error rate limit.

Fundamental to achieving the performance improvement characteristics inherent to the use of orthogonal spreading codes, be it Walsh or a PN code, the transmitter of the system must map the interleaved data symbols into corresponding spreading codes. The "demapping" of these encoded signals will then be performed by the correlation receiver within the system, the output of which is a "soft decision metric" which is then fed to a decoder for decoding. Thus, it is the accuracy of this "soft decision metric" which ultimately determines the accuracy and sensitivity of the receiver.

These prior art systems often determine a soft decision metric for each encoded bit without considering the dependencies among these metrics. FIG. 1 depicts just such a system. Specifically, FIG. 1 depicts a prior art communication system wherein a digital information signal 110 is convolutionally encoded 112, interleaved 116 and orthogonally encoded 120. In for example 64-ary orthogonal encoding, the interleaved data symbols 116 are grouped into sets of six to select one out of the 64 orthogonal codes to represent the set of six data symbols. These 64 orthogonal codes preferably correspond to Walsh codes from a 64 by 64 Hadamard matrix wherein a Walsh code is a single row or column of the matrix. The orthogonal encoder 120 outputs a sequence of Walsh codes 122 which correspond to the input data symbols 116. The sequence of Walsh codes 122 are upconverted 124 and transmitted 128, 129.

This orthogonally encoded, spread spectrum signal 130 is then received at the receive antenna 131 at some distance away. Front-end processing is performed 132 on the signal 130 prior to demodulation 136 where the signal is broken into its in-phase 140A and quadrature 138A components of digital samples. The two components 138A, 140A of digital samples are then grouped into predetermined length groups (e.g., 64 sample length groups) of sampled signals that are independently input to orthogonal decoders in the form of fast Hadamard transformers 142, 144, which output a plurality of transformer output signals (e.g. when 64 sample length groups are input, then 64 transformer output signals are generated). The output signals are squared 148, 158 and summed 162A. In addition, each transformer output has an associated index data symbol which indicates which particular orthogonal code from within a set of mutually orthogonal codes that the transformer output signal corresponds to (e.g. when 64 sample length groups are input, then a 6 bit length index data symbol can be associated with the transformer output signal to indicate the particular 64 bit length orthogonal code to which the transformer output signal corresponds). Subsequently, each transformer output signal within the groups of transformer output signals 160 and 166 is squared by the transformer output squaring mechanisms 148 and 158, respectively. Subsequently, a group of energy values 156A . . . N is generated (e.g. when 64 transformer output signals are generated) by adding mechanism 152 which adds together each pair of squared transformer output signals 150, 154 (i.e., one from each of the transformer output signal squaring mechanisms 148 and 158) having associated index data symbols which indicate that the transformer output signals correspond to the same orthogonal code.

The energy values with the same index in each group of the resulting signal 156A from each branch of the Rake receiver 156A, 156B . . . 156N will then be summed 164 to provide a group of summed energy values 166. The energy value with index i in a group of summed energy values 166 corresponds to a measure of confidence that the group of sampled signals, which generate this group of summed energy values 166, corresponds to the i -th Walsh symbol. The group of summed energy values with associated indices will then be sent to a dual maxima metric generator 168 where a single metric for each encoded data bit is determined thereby producing a single set of aggregate soft decision data 170. The aggregate soft decision data 170 is then deinterleaved 172 prior to final maximum likelihood decoding 176. As stated above, the soft decision metric determination, in this case done in the dual maxima metric generator 168, plays a large role in the determining the sensitivity of the receiver.

To fully appreciate the improvements made over the prior art, a further detailed description of the decoding process, and specifically the soft decision process of the prior art is warranted. The dual maxima metric generator 168 receives a group of summed energy values 166 with the associated symbol indices from summer 164. Initially, the dual maxima metric generator 168 searches the set of data for the energy of the symbol index having the maximum energy of all symbols having a "0" as the first digit of the binary equivalent of the symbol index. Next the dual maxima metric generator 168 will search the set of data for the energy of the symbol index having the maximum energy of all symbols having a "1" as the first digit of the binary equivalent of the symbol index. The dual maxima generator then takes the difference between these two energy values, forming a signed, quantized difference value which is then sent to the deinterleaver as aggregate soft decision data 170. Therefore, the dual maxima metric generator 168 calculates a soft decision metric on an encoded bit-by-encoded bit basis, without regard for the interdependency among the encoded bits. The dual maxima metric generator 168 then repeats these operations for the other digits in the symbol index, thus creating a soft decision value for each digit in the symbol index.

Improvements in receiver sensitivity may be obtained by redefining the means by which the soft decision metric is determined by taking into account such inter-bit dependencies. Thus, a need exists for a decoder which improves the channel estimation process to realize an corresponding increase in the communication systems' user capacity.

BRIEF DESCRIPTION OF THE DRAWINGS

FIG. 2 generally depicts a block diagram of a preferred embodiment communication system using orthogonal spreading codes and conditional metric decoding in accordance with the invention.

FIG. 3 generally depicts a Maximum Conditional Likelihood (MCL) decoder in accordance with the invention.

FIG. 4 generally depicts a representation of an array in which deinterleaved log-likelihood values are stored.

DETAILED DESCRIPTION OF THE PREFERRED EMBODIMENT

Figure 1:
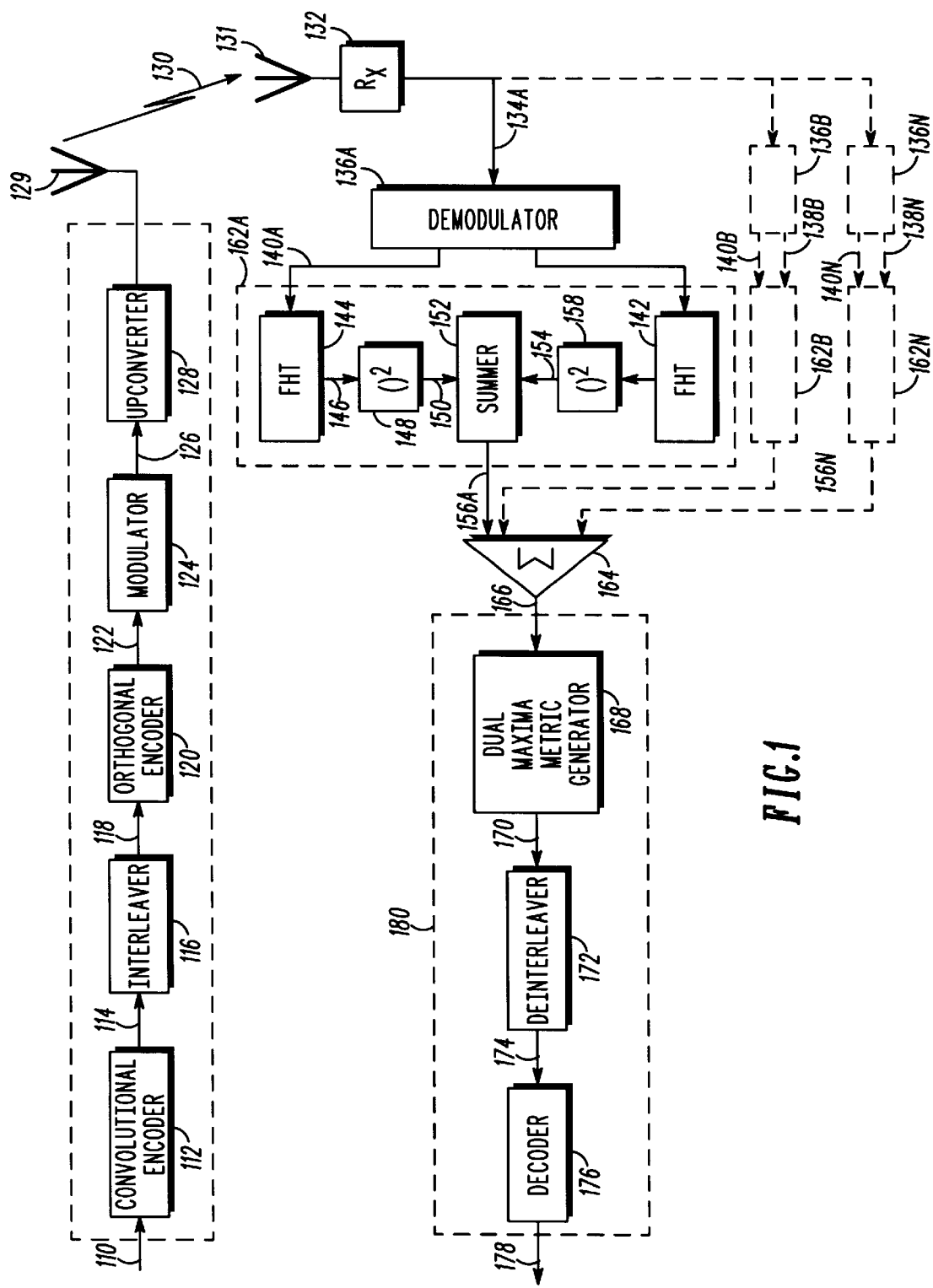
FIG. 1 generally depicts a block diagram of a prior art communication system using orthogonal spreading codes and dual maxima metric decoding.

Generally stated, a decoder implemented in a receiver of a wireless communication system employs an improved method and apparatus for decoding an encoded signal. The receiver sums the energy values from a plurality of fingers within to produce an aggregate energy value. From the aggregate energy value, a set of log-likelihood values are generated with a non-linear function generator before being deinterleaved by a deinterleaver. The deinterleaved values are input to the decoder which estimates the original signal by incorporating path histories of bits in the estimation of subsequent, related bits. Use of the path histories of bits improves the estimates of the original signal, which translates into an increase in the sensitivity of the receiver.

More specifically, a receiver implements a decoder for decoding an encoded signal, where the encoded signal has undergone interleaving by a transmitter. To perform the improved decoding, the encoded is first received by the receiver and divided into its in-phase and quadrature components. Then, energy values for each of the in-phase and quadrature components are generated, which are squared and summed to produce a composite energy value. Next, the composite energy value is summed with another composite energy value to produce a group of summed energy values, and a set of log-likelihood values are generated from the group of summed energy values. The set of log-likelihood values are deinterleaved, a set of conditional soft decision metrics from the set of log-likelihood values are generated and a bit metric from the set of conditional soft decision metrics is generated based upon a hard coded symbol value.

In the preferred embodiment, the receiver is a RAKE receiver which is either coherent, non-coherent, or quasi-coherent. The division of the encoded signal into its in-phase and quadrature components is performed by a fast Hadamard transform (FHT), while the set of log-likelihood values is generated by a applying non-linear function to the group of summed energy values. The non-linear function is a zero-th order modified Bessel function for a static channel, or a null-function for a Rayleigh fading channel. The size of the set of conditional soft decision metrics depends upon where in a Walsh symbol index a particular bit under consideration lies.

Also in the preferred embodiment, the improved decoder generates a branch metric from the bit metric, calculates a path metric from the branch metric, and estimates the signal from the path metric. Then, the decoder generates path decision history data from the path metric and generates a hard-coded symbol value from the path decision history data. In the preferred embodiment, the path metric is made up of a surviving branch metric from a plurality of branch metrics and the generation of the hard-coded symbol value is achieved by convolutionally encoding the path decision history data. The hard coded symbol values are then used to provide a convolutionally encoded representation of the path history thereby improving the probability that the bit metric generator will select a correct bit metric from the set of conditional soft decision metrics.

FIG. 2 generally depicts a block diagram of a preferred embodiment communication system using orthogonal spreading codes and conditional metric decoding in accordance with the invention. It should be noted that this embodiment is designed to operate within the context of the reverse link defined in the Interim Standard (IS) 95. For more information on IS-95, see TIA/EIA/IS-95, *Mobile Station-Base Station Compatibility Standard for Dual Mode Wideband Spread Spectrum Cellular System*, July 1993, herein incorporated by reference. Nonetheless, it is envisioned that the claimed invention may be used to decode any digitally encoded signal such as that described in the requirements for Groupe Special Mobile (European TDMA communication systems), Personal Communication System (PCS) Standards, and Interim Standard 54 (United States TDMA communication systems).

In FIG. 2, the transmitter 118, front end receiver 132, demodulation 136, and the orthogonal despreading 162 of the received signal are similar to that of the prior art communication depicted in FIG. 1. The significant difference which provides for the improved receiver sensitivity occurs in the soft decision metric generation which occurs in the maximum likelihood decoder 180, after all of the signals from the individual branches of the receiver are summed by the summer 164. In the preferred embodiment, the receiver is a RAKE receiver, the general operation of which is well known in the art.

Specifically, FIG. 2 shows the groups of energy values 156A . . . N generated by the individual fingers of the RAKE receiver feeding into a summer 164. The summer 164 adds each of the individual energy values (156A . . . N) with the same index to produce a group of summed energy values 166. Each of the values (e. g. the value with index i) in a group of the summed energy values 166 is transformed with a nonlinear function transformer 205 which calculates the log-likelihood value of the group of sampled signals corresponding to each of the Walsh symbol values (e. g., the i-th Walsh symbol). In general, the characteristic of the nonlinear function transformer 205 is a nonlinear function. For example, for a static channel, it is the zero-th order modified Bessel function Io(x). However, when the channel is a Rayleigh fading channel, the log-likelihood value 207 is simply the energy value itself. In such a case, no transformation is required.

The result of the nonlinear function transformation 205 is a set of log-likelihood values 207. Using a signal transmitted on the reverse link (mobile station to base-station) as defined by IS-95 as an example, the signal received by the base-station is decoded for each frame of data, where each frame consists of 96 sets of log-likelihood values 207. These sets are then directed to the deinterleaver 210. The function of the deinterleaver 210 is to de-interleave the sets of log-likelihood values 207 for decoding the data symbols which had been interleaved during the encoding process. Specifically, the 96 sets of log-likelihood values 207 are organized as a matrix, which has 3 columns and 32 rows, as shown in FIG. 4. Each element of the matrix is a group of log-likelihood values.

The deinterleaved sets 213 of the log-likelihood values 207 are then sent to the conditional metric decoder 215 in accordance with the invention. It is in the conditional metric decoder 215 that the step of soft decision metric generation occurs, and will be best described with reference to the block diagram of FIG. 3.

FIG. 3 generally depicts a Maximum Conditional Likelihood (MCL) decoder 215 in accordance with the invention. As stated above, the deinterleaved sets of log-likelihood values 213 are supplied to the MCL decoder 215. The deinterleaved sets 213 of log-likelihood values 207 are directed to a conditional soft decision data generator 310 which produces a set of conditional soft decision values 313 for each set of log-likelihood values 213. The size of this set of conditional soft decision values 313 will depend on where in the index the particular bit under consideration lies. For example, if it is the first bit in the Walsh symbol there will be $2^{1-1}$, or 1 value generated, however if it is the sixth of six bits in the Walsh symbol, there will be $2^{6-1}$, or 32 values in the set. Therefore, where the Walsh symbol is six bits in length, there will be a total of 63 (1+ . . . +32=63) values generated by the conditional soft decision data generator 310 for each Walsh symbol.

The set of conditional soft decision values 313 is then passed to the bit metric generator 315 which selects a bit metric 318 from the set of conditional soft decision values 313, based upon a hard coded symbol value 338 (which will be discussed infra). The bit metric 318, selected by the bit metric generator 315, is directed to a branch metric calculator 320 which generates a branch metric 323 from the bit metric 318. In the preferred embodiment, the branch metric 323 is comprised of three bit metrics 318. Continuing, the branch metric 323 is coupled to a metric calculator 325 which maintains a path metric value for each decoder state. The metric calculator 325 uses the path metric values and branch metrics 323 to generate path decision data 327. The path decision data 327 is passed to a trellis calculator 330 which maintains a history of path decision data for each decoder state. From this history, the trellis calculator 330 determines an estimated original data signal 178 of the original information data signal 110.

Now referring back to FIG. 2, the deinterleaver 210 receives groups of log-likelihood values 207 from the nonlinear function transformer 205 and stores them into a memory array 400 as shown in FIG. 4. Each group of log-likelihood values 207 is received from the nonlinear function transformer 205 and stored into one of the memory array elements, $M_{i,j}$. The first group of log-likelihood values 207 received for a frame of data is stored into memory element $M_{1,1}$. The next group is stored into $M_{1,2}$, and the third one is stored into $M_{1,3}$. When the deinterleaver 210 receives the fourth group of log-likelihood values 207, a pointer in the memory array moves down one row and stores this group into memory element $M_{2,1}$. The deinterleaver 210 continues receiving groups of data and storing them sequentially across columns and down rows until the memory element $M_{32,3}$ of the memory array 400 is filled. At this point, all 96 elements in the array 400 are filled, and the deinterleaver 210 now begins to feed the array of data to the MCL decoder 215.

The deinterleaving process is described below, and is further described in a later description of the bit-metric generation process. To begin, the deinterleaver 210 retrieves data from the memory array 400 on an as needed basis for the MCL decoder 215. The deinterleaver 210 first retrieves the set of log-likelihood values 213 in element $M_{1,1}$ of the array 400 and feeds the values 213 to the conditional soft decision data generator 310. The next element retrieved is $M_{2,1}$, then $M_{3,1}$, then continuing down the row until the log-likelihood values contained within all the elements in the first column have been fed to the conditional soft decision data generator 310. Each time the deinterleaver 210 feeds the conditional soft decision data generator 310 a set of log-likelihood values 213, the conditional soft decision data generator 310 computes a set of conditional soft decision values 313 for one of the bits in the six bit Walsh symbol index. The deinterleaver 210, therefore, feeds the first column of data to the conditional soft decision data generator 310 a total of six times per element, once for each bit in the Walsh symbol index.

The deinterleaver 210 then moves to the second column of the array 400 and retrieves the set of log-likelihood values 213 contained in element $M_{1,2}$, feeding these log-likelihood values 213 to the conditional soft decision data generator 310. It then sends the log-likelihood values 213 contained in $M_{2,2}$, then $M_{3,2}$, continuing down the rows until all elements in the second column of the array 400 have been fed to the conditional soft decision data generator 310. Like the operation on the first column, the deinterleaver 210 repeats this operation for the second column another five times per element. The deinterleaver 210 then repeats the operation for the third column, feeding the data contained in the third column of the array 400 a total of six times per element to the conditional soft decision data generator 310.

Figure 5:
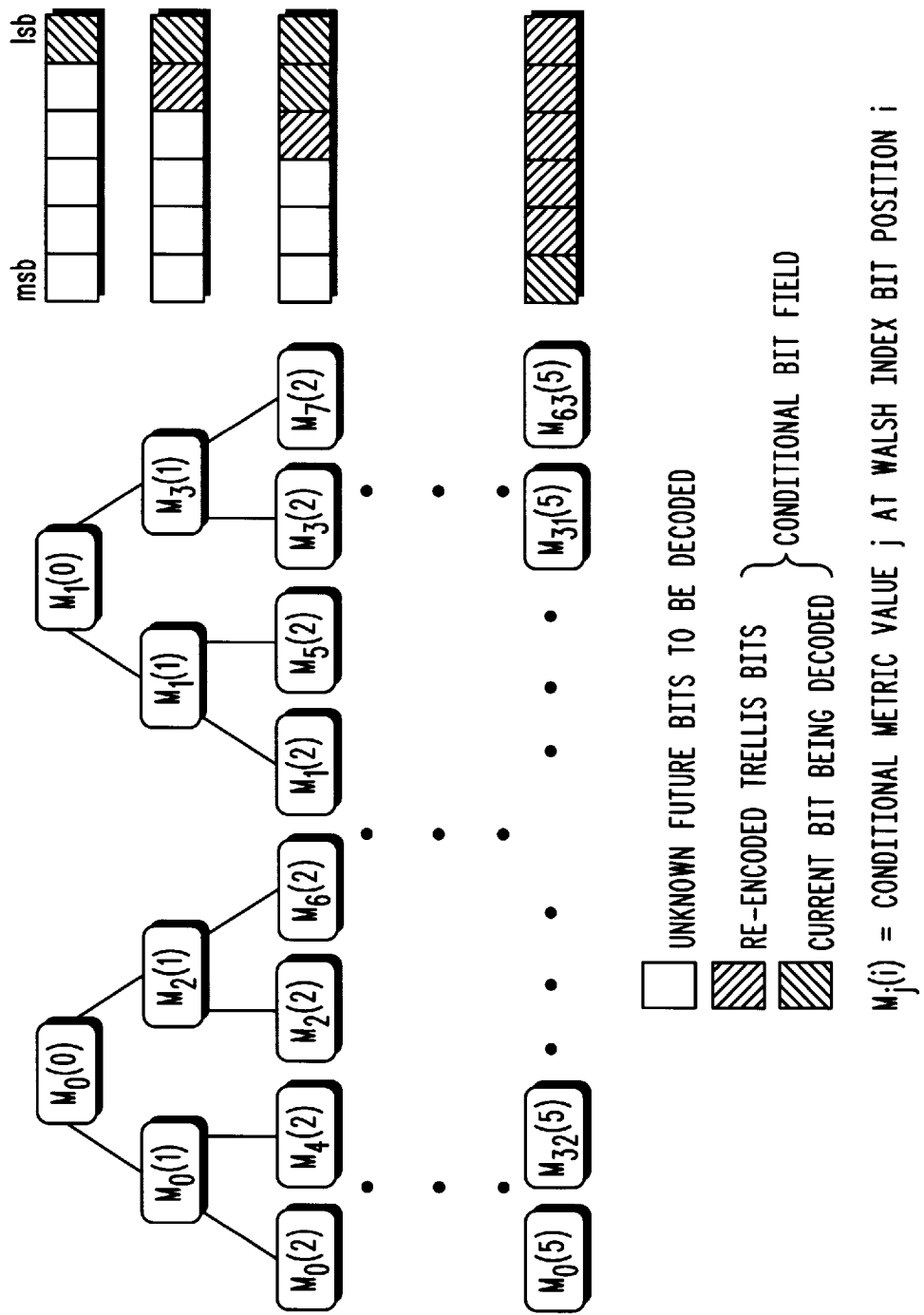
FIG. 5 generally depicts a conditional soft decision metric tree diagram in accordance with the invention.

In order to best describe the generation of the conditional soft decision metrics, reference is made to FIG. 5. For the first bit in the binary equivalent of the Walsh symbol index, two conditional soft decision metrics ($M_0(0)$ and $M_1(0)$) are generated, which is similar to the result of the dual maxima metric generator 168, described with reference to the prior art of FIG. 1. As in the dual maxima metric generator 168, the conditional soft decision metric generator 310 searches for the log-likelihood value 213 of the Walsh symbol index having the maximum energy value, denoted as $M_0(0)$, of all the log-likelihood values having a "0" as the first bit of the symbol index. Next the conditional soft decision metric generator 310 will search for the log-likelihood value 213 of the symbol index having the maximum energy value, denoted as $M_1(0)$, of all the log-likelihood values 213 having a "1" as the first bit of the symbol index. If the energy of $M_0(0) > M_1(0)$, $M_1(0)$ will be set to $M_1(0) - M_0(0)$, while $M_0(0)$ will be set to 0. Otherwise, if $M_0(0) < M_1(0)$, then $M_1(0) = 0$ and $M_0(0) = M_0(0) - M_1(0)$. The difference between the conditional soft decision metric generator and the dual maxima metric generator 168 is highlighted when calculating the metrics associated with the second and subsequent bits of the Walsh symbol index.

Next consider the second bit in the binary equivalent of the Walsh symbol index. In this case four conditional soft decision metrics 313 will be generated, namely, the conditional soft decision metrics of the first symbol index whose first bit and second bit being 00, 01, 10, 11, denoted as $M_0(1)$, $M_2(1)$, $M_1(1)$, and $M_3(1)$. To determine the conditional soft decision metrics of $M_0(1)$ and $M_2(1)$, the conditional soft decision metric generator 310 first searches for the energy of the Walsh symbol index having the maximum energy of all the log-likelihood values 213 having "00" as the first and second bits of the index. Next the conditional soft decision metric generator 310 will search for the energy of the Walsh symbol index having the maximum energy of all the log-likelihood values 213 having "01" as the first and second bit of the index. If $M_0(1) > M_2(1)$, $M_2(1)$ is set to $M_2(1) - M_0(1)$, after which $M_0(1)$ is set to 0. Otherwise, $M_0(1)$ is set to $M_0(1) - M_2(1)$, after which $M_2(1)$ is set to 0. The conditional soft decision metrics $M_1(1)$, and $M_3(1)$ are determined similarly. Thus, for the second bit in the index we will have 4 conditional soft decision metrics, as opposed to merely the two soft decision metrics generated by the dual maxima metric generator 168 in the prior art.

This same process occurs for the rest of the bits in the Walsh symbol index, where, if it is the i-th of six bits in the index, there will be $2^i$ conditional soft decision metrics. Therefore, in IS-95 where the index of the Walsh symbol is six bits in length, there could be a total of 126 conditional soft decision metrics generated. However, since half of these values will be set to zero, only 63 conditional soft decision metrics, which are all negative numbers, need be stored.

The preferred method of reducing the number of conditional soft decision metrics to be stored is as follows. First, subtract the maximum energy of those Walsh symbols whose indices match the index of the conditional metric being generated and whose current bit is a 1 from the maximum energy of those Walsh symbols whose indices match the index of the conditional metric being generated and whose current bit is a 0 (e.g., $M_0(1) - M_2(1)$). The result is a single signed conditional metric value. Now, to generate the bit-metric value 318 from the signed conditional metric value, one of the conditional soft decision values 313 is first selected by the bit metric generator 315. If the expected bit is a 1 for the decoder state transition under consideration, the branch metric calculator 320 changes the sign of the bit-metric value 318, otherwise the bit-metric value 318 is unchanged. Next, the branch metric calculator sets the value to 0 if the value is positive but leaves the value unchanged if it is negative. Three of these values are then summed together to obtain the branch metric value 323 for the decoder transition under consideration. Note that this is mathematically equivalent to generating all 126 conditional soft decision values as described above and summing three of these to obtain a branch metric 323. In addition, to save on memory and computation complexity, only the top N of the log-likelihood values 213 need to be searched instead of all of the values in a set, where N=4 or 8 in the preferred embodiment. Therefore, if only the top N of the log-likelihood values 213 are searched, at most only N non-zero conditional soft decision values 313 need to be stored for each bit in the Walsh symbol index.

Now let us consider how to determine the bit metric 318 to form the branch metric 323 of a particular decoder state transition. The MCL decoder 215 starts with the set of conditional soft decision values 313 computed for the first bit of the Walsh index. This particular set of conditional soft decision values 313 are those derived from the log-likelihood values 207 stored in the upper left element of the deinterleaver matrix 400, denoted as $M_{11}$. In general, we shall denote the element located at the i-th row and j-th column of the deinterleaver matrix by $M_{ij}$. When creating a bit metric 318 for the first bit in the Walsh symbol index, the bit metric for the bit being zero or one is simply equal to the corresponding soft decision conditional value 313 for this first bit. After generating the bit metric for the first bit of the Walsh symbol index from the set of conditional soft decision values derived from the group of log-likelihood values stored in $M_{11}$, the bit metric generator 315 generates the bit metric for the first bit of the Walsh symbol index from the set of conditional soft decision values derived from the log-likelihood values in $M_{21}$, which is one row below the previous element in the matrix. This process continues until all the bit metrics are generated from the sets of conditional soft decision values computed for the first bit of the Walsh symbol indexes.

Next, the bit metric generator 315 generates the bit metric for the second bit in the Walsh indices. It starts from element $M_{1,1}$ again. For the second bit in the index, the decoder must retrieve the stored path history of the state from which the branch starts, then re-encode the proper path history bits to determine the value (zero or one) of the first bit in the index of the Walsh symbol. Assuming the value of the re-encoded first bit is a 0, the conditional soft decision values of $M_0(1)$ or $M_2(1)$ will be used as the bit metric 318 for the second bit being zero or one, respectively. Otherwise, if the first bit is a 1, the conditional soft decision values of $M_1(1)$ or $M_3(1)$ will be used. This process continues until the bit metrics are generated for the second bit of the Walsh symbol index from the set of conditional soft decision values computed from the log-likelihood values contained in element $M_{32,1}$. Then the bit metric generator 315 generates the bit metrics 318 for the third bit of the Walsh index from the set of conditional soft decision values derived from the log-likelihood values stored in $M_{1,1}$.

For the third bit in the Walsh symbol index, eight bit-metric values are possible depending on the re-encoded first and second bits along the trace back path and so on for the bit metric generation for the fourth, fifth and sixth bits in the Walsh symbol indices. The bit metric generation process always starts from the first row and progresses down until arriving at the 32nd row in the first column.

After all the bit-metrics for the six bits of the 32 Walsh indices in the first column are generated, the bit metric generator 315 generates the bit metrics from the sets of conditional soft decision values computed from the log-likelihood values stored in the second column of the deinterleaver matrix 400. Similar to above for the first column, it generates the bit-metrics of the first bits in $M_{1,2}$ through $M_{32,2}$, and then the second bit, the third bit, until the sixth bits in these elements are generated. The bit-metric generation for the third column of the metrics is similar to that for the first two columns by going through $M_{1,3}$ through $M_{32,3}$ six times.

Now let us consider the processing of these bit metrics by the MCL decoder 215. The MCL decoder 215 uses a group of bit-metric values 318 to form a set of branch metrics 323 for use at each particular time state of the MCL decoder 215. The number of bit-metric values 318 in the group used to form each set of branch metrics 323 corresponds to the number of data symbols 114 at the output of the convolutional encoder 112 generated from each input data value 110. For example, when a rate 1/3 convolutional encoder is used in the transmitter, three data symbols 114 are generated from each input data value 110. Thus the branch metric calculator 320 uses groups of three individual bit-metric values 318 to form branch metrics 323 for use at each time state in MCL decoder 215. The branch metric calculator 320 produces one branch metric value 323 for each transition from one decoder state to another. Each branch metric 323 is the sum of the three bit-metric values 318.

As in a conventional Viterbi decoder, the MCL decoder has $2^{(K-1)}$ states, where K is the constraint length of the convolutional code. The metric calculator 325 stores $2^{(K-1)}$ path metrics, i. e., one path metric per state. The metric calculator 325 receives one branch metric 323 from the branch metric calculator 320 for each of the $2^k$ transitions from a current decoder state to the next decoder state. For each decoder state, two branch metrics are added to the path metric for that state to form a total of $2^K$ accumulated path metrics. There will be two such accumulated path metrics merge into each of the $2^{(K-1)}$ next decoder states. The larger one of the two accumulated path metrics survives and becomes the new path metric of that state, while the smaller one is deleted. Path decision data 327 is sent to the trellis calculator 330 to indicate which of these two paths into the next decoder state is the surviving path.

The trellis calculator 330 receives the path decision data 327 from the metric calculator 325 and stores this information into memory. The trellis calculator 330 maintains a memory array of this path decision data 327, with each element of the array containing path decision history data for its respective decoder state. It is known to one skilled in the art that the trellis calculator can maintain either an array of path transition data, or it can maintain an array of information data corresponding to each path. In the preferred embodiment, the trellis calculator 330 maintains an array of information data and as such, does not need to trace back the path in order to obtain the information data corresponding to that path. Since the convolutional encoder 335 needs to re-encode the information data corresponding to the surviving path for each decoder state, this implementation avoids time consuming trace-back operations. The path decision data 327 consists of a single bit of information for each transition into the next decoder state. This information is the most significant bit of the surviving decoder state, where the surviving state is the winner of the two possible decoder states which can transition into the next decoder state. Since there are $2^{(K-1)}$ decoder states, the metric calculator 325 passes $2^{(K-1)}$ of these path decision 327 values to the trellis calculator 330 for each decoder time step.

The trellis calculator 330 receives the path decision data 327 from the metric calculator 325, thus providing the trellis calculator 330 information as to which of the two possible decoder states is the survivor. It then retrieves the trellis of the surviving decoder state and shifts the trellis data to the left (in the direction of the least significant bit to the most significant bit) one bit. As the data is shifted to the left, a new information decision data bit is shifted into the least significant bit of the trellis. This bit is the same bit as the one which indicates the surviving state, namely the path decision data bit (327). The shifted trellis now contains a path history of information data. The least significant bit of the trellis is the most recently decoded data for the decoder state, and the most significant bit is the oldest decoded bit for the decoder state. The newly calculated trellis is then written into the trellis array element for the next decoder state currently being calculated. This continues until the trellis for all $2^{(K-1)}$ decoder states have been updated by the trellis calculator 330.

The process of determining the transmitted data is the same as that in a conventional Viterbi decoder. Namely, after a sufficient number of transitions have occurred in the decoding process, the decoder 215 selects the decoder state with the largest path metric and retrieves the stored path decision data history of that decoder state to make a decision on the data bit D time steps back. In an alternative embodiment, the decoder will keep all the path decision data history until all the path metrics are generated and processed in a frame. The decoder will then retrieve the path decision data history starting from the known terminating state, which is the zero state for IS-95 signalling, to determine all the data bits along that path at once.

The trellis calculator 330 feeds path decision history data 332 to the convolutional encoder 335. This path decision history data 332 is the information data corresponding to the surviving path which ends in one of the decoder states. The convolutional encoder 335 then convolutionally encodes this path decision history data 332 in the same manner that the original information data was encoded. The convolutional encoder 335 encodes the proper portions of the path decision history data 332 to obtain the hard-coded symbol values 338 corresponding to the Walsh index bits which were previously processed by the decoder. These hard-coded symbol values 338 represent previous Walsh index bits for the current decoder state, and, therefore, are used by the bit metric generator 315 to select the proper bit metric 318 from the set of conditional soft decision values 313.

In a previous discussion of the bit metric generator 315, reference was made to a hard coded symbol value 338 which was instrumental in the generation of the bit-metric value 318. This is because the hard coded symbol value 338 represents the re-encoded 335 trellis path decision history 332 for the current time state. That is to say, the claimed invention does not make a soft decision metric determination based merely on the energy contained in an individual Walsh bit as disclosed in the prior art, but rather utilizes a look-back mechanism of re-encoding the path decision history 332 into a hard coded symbol value 338 representative of the interdependence between the Walsh symbol bits. Therefore, the bit metric value for a current Walsh bit is dependent upon the state of previous Walsh bits within a given Walsh symbol.

While the above description details the preferred embodiment of the MCL Decoder 215, the decoder can also be applied in many other applications where convolutionally encoded and interleaved data passes through a device or communication channel possessing memory. An example of a device with memory is an orthogonal Hadamard coder such as the one used in the IS-95 reverse link as described in the preferred embodiment. Another example of a communication channel with memory is one in which the channel provides multiple paths for the signal to pass from the transmitter to the receiver. As a result, the received data becomes distorted due to previously transmitted symbols interfering with the current symbol being received. Since the data being received for the current symbol is dependent upon previously transmitted symbols, the channel has introduced memory into the received symbol sequence. Still another example of memory in a channel is the phase dependency between received symbols. The characteristic response of the channel may remain nearly constant over a period of time which may span several symbol periods. In this type of a channel, a traditionally non-coherent receiver may be converted to a coherent receiver over a given number of symbols by incorporating the MCL decoder 215. In addition to those examples described herein, various other embodiments of the MCL Decoder are possible; however, the underlying operation of improved decoding in accordance with the invention is common throughout.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What I claim is:

1. A method of decoding an encoded signal in a receiver, the encoded signal having been interleaved by a transmitter, the method comprising the steps of:

(a) receiving the encoded signal;
   (b) processing the encoded signal into a set of log-likelihood values by applying a non-linear function to a group of summed energy values;
   (c) deinterleaving the set of log-likelihood values;
   (d) generating a set of conditional soft decision metrics from the set of log-likelihood values;
   (e) generating bit metrics from the set of conditional soft decision metrics based upon a hard coded symbol value;
   (f) decoding the bit metrics to produce an estimate of a signal before encoding;
   (g) generating a plurality of branch metrics from the bit metrics;
   (h) selecting a surviving branch metric from the plurality of branch metrics;
   (i) generating path decision history data based on a predetermined number of selections of surviving branch metrics;
   (j) estimating the signal before encoding from the surviving branch metric and the path decision history data; and
   (k) generating the hard-coded symbol value from the path decision history data.

2. The method of claim 1, wherein the step of receiving the encoded signal is performed by a RAKE receiver.

3. The method of claim 1, wherein the step of receiving the encoded signal is performed by either a coherent, non-coherent, or quasi-coherent receiver.

4. The method of claim 1, wherein the step of processing the encoded signal into a form suitable for deinterleaving is performed, in part, by a fast Hadamard transform (FHT).

5. The method of claim 1, wherein the non-linear function is a zero-th order modified Bessel function for a static channel, or a null-function for a Rayleigh fading channel.

6. The method of claim 1, wherein a size of the set of conditional soft decision metrics depends upon where in a symbol index a particular bit under consideration lies.

7. The method of claim 6, wherein the symbol index is a Walsh symbol index.

8. The method of claim 1, wherein the path decision history data is made up of a first surviving branch metric from a plurality of branch metrics.

9. The method of claim 1, wherein the step of generating a hard-coded symbol value further comprises convolutionally encoding the path decision history data for each decoder state.

10. The method of claim 1, wherein the hard coded symbol values are used to provide a convolutionally encoded representation of the path history thereby improving the quality of the bit metric.

11. An apparatus for decoding an encoded signal, the encoded signal having been interleaved by a transmitter, the apparatus comprising:

(a) a receiver for receiving the encoded signal and processing the encoded signal into a form suitable for deinterleaving;
   (b) a deinterleaver, coupled to the receiver, for producing a set of log-likelihood values;
   (c) a conditional soft decision metric generator for generating a set of conditional soft decision metrics from the set of log-likelihood values;
   (d) a bit metric generator for generating bit metrics from the set of conditional soft decision metrics based upon a hard coded symbol value;
   (e) a branch metric generator for generating a plurality of branch metrics from a series of bit metrics;
   (f) a path metric calculator for determining a path metric based on the plurality of branch metrics;
   (g) a trellis calculator for estimating the signal from the path metric; and
   (h) a convolutional encoder for encoding a set of path decision history data into the hard coded symbol value supplied to the bit metric generator.

12. The apparatus of claim 11, wherein the hard coded symbol data supplied by the convolutional encoder provides encoded path history for use in determining a most likely bit metric from the set of conditional soft decision metrics.

13. A method of decoding an encoded signal, the encoded signal having been interleaved by a transmitter, the method comprising the steps of:

(a) receiving the encoded signal and processing the encoded signal into a form suitable for deinterleaving;

(b) producing a set of log-likelihood values;

(c) generating a set of conditional soft decision metrics from the set of log-likelihood values;

(d) generating bit metrics from the set of conditional soft decision metrics based upon a hard coded symbol value;

(e) generating a plurality of branch metrics from a series of bit metrics;

(f) determining a path metric based on the plurality of branch metrics;

(g) estimating the signal from the path metric; and (h) encoding a set of path decision history data into the hard coded symbol value supplied to a bit metric generator.

* * * * *